United States Patent Office 3,381,387
Patented May 7, 1968

3,381,387
MICROPOINT LOCATOR GAUGE
James A. Landrum, Jr., 7215 S. Park Ave.,
Chicago, Ill. 19606
Filed Mar. 16, 1966, Ser. No. 534,741
2 Claims. (Cl. 33—189)

ABSTRACT OF THE DISCLOSURE

A square gauge has scales on each of two perpendicular arms for defining distances along the length of arms relative to the location of a smaller pilot hole at the apex of the square. Movable anvils on the arms may be put at any convenient location in order to place the pilot hole at a precise point with respect to the edges of a work piece. The position of the hole (in front of the apex) and the shape of the anvils (a bias cut on the interferring corners) cooperate to eliminate or reduce interferences with protrusions on the surface of the work piece. The ratio of diameter to depth of the pilot hole is selected to give a maximum stability.

---

This invention relates to scientific measuring instruments and more particularly to micropoint locators.

As used herein, the term "point locator" means a scientific measuring instrument used primarily—although not exclusively—in connection with machine tools for locating a point with respect to fixed boundaries. For example, the point could be a pilot hole, and the boundaries could be the edges of a work piece. The prefix "micro" is added to the term "point locator" to signify that the point is located within a tolerance or error range having a magnitude usually expected from the finest calipers, micrometers, and the like.

The invention does not primarily concern itself with the reasons why such a precise point location is desired. However, to provide concrete illustrations of the invention, it may be well to describe a few exemplary uses. The point could be located as a part of a production process, as when a hole is drilled in a work piece. It could also be located as part of a copying process, as when a previously finished work piece is duplicated. Or, it could be located when a finished work piece is inspected as part of a quality control process. Those skilled in the art will readily perceive many other reasons why such a micropoint location is desired.

Heretofore, the task of making a point location within the pertinent tolerance range has been a time consuming one. Among other things required to locate a point during production, it has been necessary to scribe arcs, center punch, and then position a work piece in a machine tool. The alternative was to provide expensive production tools, such as jigs, holders, pantographs, etc. During copying, it has been necessary first to use instruments, such as micrometers, to make drawings. Then, to transfer the information in the drawing into a work piece, it was necessary to proceed with the scribing and other production tasks. Each of these and comparable operations were very much subject to human errors.

If mistakes occur in any of the many conventionally required steps, an entire project usually fails. Then, a finished or semi-finished work piece may be rejected. The cost of the rejected piece could be very high if a significant amount of work had already been done on it.

Accordingly, an object of the invention is to provide new and improved scientific measuring instruments. In particular, an object is to facilitate micropoint location. Here an object is to provide location measurements having a degree of accuracy which falls within the tolerance ranges usually expected from the finest micrometers.

Further, an object is to reduce the chances for human error during point location. In this connection, an object is to provide the desired functions with a very simple and easily constructed device having virtually no built-in sources of human error.

Yet another object is to accomplish the foregoing objects at a relatively low cost and in a highly reliable manner. Here, an object is to provide a scientific instrument which can also be used as a production tool in lieu of jigs, holders and the like.

In keeping with one aspect of the invention, these and other objects are accomplished by means of an instrument having two rigidly interconnected arms. The arms have a predetermined angle with respect to each other and a relatively small hole near the junction thereof. A drill, center punch or similar device fits into the hole with a precise relationship which is within acceptable tolerance limits. Each arm has an associated movable anvil which may be secured to the arm at any desired location, along the length thereof, with respect to the hole position. A scale is engraved or otherwise written on each arm for indicating the anvil positions relative to the hole position.

To use the micropoint locator gauge, the two anvils are first locked into desired positions. Then, the gauge is placed over a work piece with a face surface on each of the anvils held against the edges of the work piece. Thus, the hole is located over the work piece at the distances from its edges which are indicated on the gauge scales. Finally, a drill is lowered through the hole and then turned to drill a pilot hole at the indicated location in the work piece.

The nature of the micropoint locator gauge may become more apparent from a study of the following description in view of the attached drawings, in which.

Figure 1:
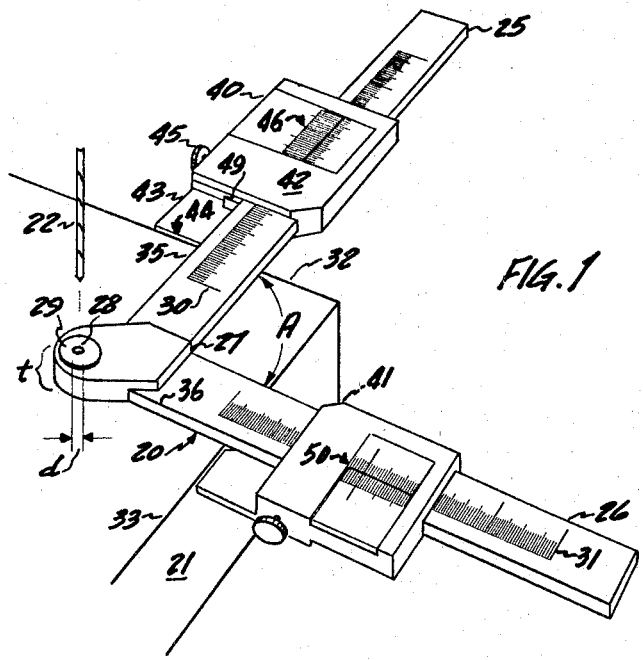
FIG. 1 is a perspective view of the micropoint locator gauge, a work piece, and a drill.

FIG. 1 discloses the micropoint locator gauge 20, a work piece 21, and a drill 22. The drill 22 may be supported and operated in any convenient manner, as in a drill press, for example. In another embodiment of the invention, the drill is replaced by a center punch.

The micropoint locator gauge 20 has two arms 25, 26 rigidly interconnected at 27 to form an angle A which is preferably 90°. The decision to make this angle 90° is primarily one of convenience for most job requirements since most piece parts have generally rectangular shapes or straight edges. If other shapes are to be measured, it may be convenient to make the angle A larger or smaller than the 90° angle disclosed here.

Near the junction of the arms 25, 26 is a small hole 28 extending completely through the material from which the micropoint locator 20 is made. The drill 22 may be passed through this hole and then rotated to drill a pilot hole in the work piece 21 at the precise location defined by the micropoint locator gauge scales.

The diameter $d$ of the hole 28 is in the order of $\frac{1}{32}$ to $\frac{1}{64}$ of an inch in one exemplary embodiment of the invention. To provide stability for the drill 22, the thickness $t$ of the micropoint locator gauge is increased—to approximately one-quarter inch in the exemplary embodiment. Thus, the ratio of the diameter to the depth of the hole 28 is in the order of 1:8 to 1:16. To reduce errors which may result from wear, the hole 28 is drilled in wear resistant bushing 29 which is press fitted into an opening in the gauge.

The manufacturing process used to make the gauge is not essential to the invention. However, to illustrate the inventive concept, it may be well to describe how the exemplary gauge was made. The arms 25, 26 were cut and machined from a single piece of steel. The increased thickness at *t* was provided by a piece of steel riveted on top of the steel arms at the intersection thereof. Then the assembly was drilled, and a bushing 29 of hardened steel was pressed therein.

The position of the hole is precisely defined by two scales 30, 31 which are engraved or otherwise written on the arms 25, 26 respectively. The principle is that the hole 28 is located at precisely the distance from the edges 32, 33 which is indicated by these scales. Therefore, in theory, the hole may be located any place where its position may be determined from a reading of the scales 30, 31. However, there are certain practical considerations which are best served if the hole 28 lies on a line which bisects the angle A and is centered at the intersection of two line projections extended along outer edges 35, 36.

It should be noted that the general region near the apex of the gauge is extended to project forwardly beyond the outer edges of the arms 25, 26. This way, the pilot hole may be located at the front of the gauge. Thus, there is a minimum of interference between the gauge and any protrusions on the work piece being measured by the gauge.

The diameter of the hole 28 is selected relative to the diameter of a twist drill 22 with a precision which allows the drill to turn freely within the hole and still drill a pilot hole within the tolerance limits usually expected from comparable measurement instruments.

Figure 2:
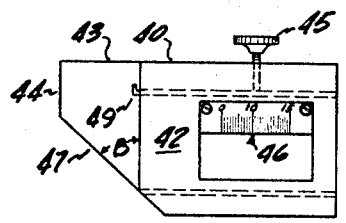
FIG. 2 is a top plan view of an anvil, per se.

A movable anvil 40, 41 is mounted on each of the arms 25, 26. Since these two anvils are identical, only the anvil 40 is described here in detail; it is also seen in FIG. 2. This anvil includes a body 42, a guide section 43, a thumb screw 45, and a vernier indicator scale 46. The body 42 is machined within close tolerances to facilitate precise measurements, snug fits, and a smooth gliding action during motion on arm 25. The guide 43 has a face surface 44 which rests against the edge 32 of the work piece 21. Preferably, this face surface 44 is made as large as practical to enable a high degree of stability, and, therefore, accuracy in the positioning of the instrument. To eliminate any interference between the anvils 40, 41, the guide 43 is cut at a bias at 47. If the angle A is 90°, the bias angle B is 45°.

The thumb screw 45 tightens against a foot 49, of conventional design, positioned inside the anvil to clamp it rigidly in place (no special signnificance is to be attached to the term "thumb screw." It could have been called a "locking screw" or some similar term). When the thumb screw is tightened sufficiently, the face surface 44 is perpendicular to the edge 35, assuming that the angle A is 90°. If the angle A is something other than 90°, the face surface 44 is positioned at an angle relative to the edge 35 which corresponds to the requirements of the angular displacement at A with respect to the edges 32, 33.

The indicator scale 46 may take a number of different forms. However, as shown in FIG. 1, the preferred embodiment of the invention utilizes a vernier scale. Since the construction and use of vernier scales are well known, it is sufficient to state here that the scales 30, 46 cooperate to tell the exact distance between the center of the hole 28 and the edge 32 of the work piece 21. In like manner, the reading at 50 tells exactly the distance between the center of the hole 28 and the edge 33.

Figure 3:
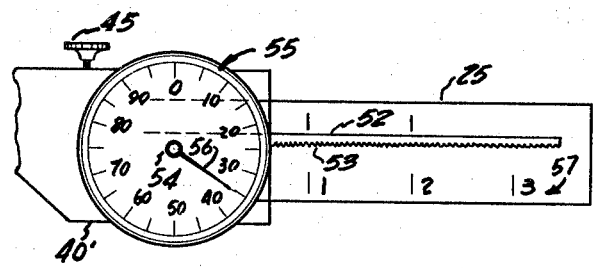
FIG. 3 is a top plan view of an alternative embodiment of the invention having a dial scale on the anvil for indicating its position along the length of the arm.
Figure 4:
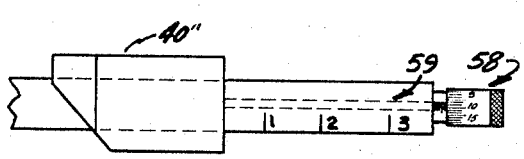
FIG. 4 is a top plan view of yet another embodiment of the invention having a micrometer type of scale thereon for indicating the anvil position.

Alternatives for the vernier scale are shown in FIGS. 3 and 4. In FIG. 3, the arm 25 is provided with a longitudinal slot or track 52 having a row of teeth along one of its sides. A gear 54 runs on these teeth to form a rack and pinion. The anvil 40' has a dial 55 mounted thereon and scaled in one-hundredths or smaller intervals. As the anvil 40' slides along the arm 25, the pinion gear 54 runs on the rack 53 to impart a rotary motion to the hand 56. Another scale 57 indicates, in inches, the distance between the hole 28 and the anvil 40'. Thus, the combination reading on dial 55 and scale 57 tells the hole location to any desired tolerance such as a thousandth or ten-thousandth of an inch.

Depending upon the gearing, a single hand 56 may sweep around the dial. Or, a pair of hands may move as the hands of a clock move.

In FIG. 4, the anvil 40'' is moved under the control of a micrometer scale arrangement 58. Again, the inch reading is indicated by the scale 59.

Figure 5:
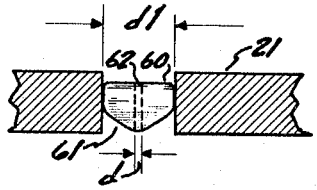
FIG. 5 shows, in partial cross section, a previously made, rather large hole in a work piece and a template used in the hole to facilitate copywork.

FIG. 5 shows a supplementary tool which may be used during copy work. In greater detail, the work piece 21 is here pictured in cross-section as having a relatively large hole drilled therein. For example, the diameter $dl$ of this hole might be one-half inch, and the diameter $d$ of hole 28 may be 1/64 inch.

The user of this micropoint indicator locator gauge will preferably have a number of templates 60 having outside diameters which correspond to the inside diameters $dl$ of the holes which are being located. In the presently assumed case, the templet 60 has an outside dameter of one-half inch. The lower side 61 of the template 60 has a generally tapered configuration to facilitate an insertion of the template in the hole.

The template 60 has a center bore hole 62 with a diameter $d$ which is the same as the diameter of the hole 28 in the gauge—here assumed to be 1/64 of an inch. Thus, to find the location of the half-inch hole, it is only necessary to insert the template 60 into the hole. Then, place the micropoint gauge of FIG. 1 in a position over the template 60. Next, pass a rod (not shown) through the two holes 28, 62. Finally, move the anvils 40, 41 in toward the work piece 21 until they touch the edges 32, 33 and then tighten the thumb screws 45.

If the micropoint gauge is now placed over another identical work piece with the anvils 40, 41 touching the edge of that work piece, the hole 28 is at the same location that the hole 62 was in when the reading was taken. The drill 22 may be passed through the hole 28 to drill a pilot hole in the new work piece. Thereafter, the pilot hole may form the guide for a half-inch drill in the assumed example.

It should be noted that this form of copying does not require the production of any drawings. However, by reading the scales at 46, 50, drawings may be made easily and accurately if it is desirable to do so. Also, if a template such as 60 is not available, a number of readings can be taken around the circumference of the large hole in the work piece. These individual circumferential readings may serve as the basis for computations which will tell where the center of the hole is located.

Those skilled in the art will readily perceive many uses for and advantages of the disclosed micropoint gauge. Chief among these advantages are a gross reduction in the time required to locate a point. In one instant, when the micropoint gauge was used, the time savings was such that a total job required less than one-tenth of the standard time normally allocated for that particular job. Another advantage of the invention is the reduction or elimination of human errors because fewer steps are required when the inventive gauge is used as compared with the number of steps which are required when the gauge is not used. Yet another advantage is the elimination of a need for special production tools, jigs, and the like, usually provided for large scale runs.

With the foregoing description in mind, the true nature of the invention may be understood from the appended claims. These claims are not to be construed as limited to the specific structure shown in the drawing. Quite the contrary, the claims are to be construed as covering all equivalents which fall within the true spirit of the invention.

I claim:

1. A micropoint locator gauge comprising a pair of rigidly interconnected arms of predetermined thickness and having inner and outer edges, said arms having an area which is substantially thicker than said predetermined thickness and covering a substantial portion of said arms, said area being near the apex of said predetermined angle, and extending to project forwardly from said apex beyond said outer edges, a wear resistant bushing in said thick area and having a relatively small pilot hole formed therein substantially near the point where projections of the outer edges of said arms intersect in said thick area, the hardness of said wear resistant bushing being selected relative to the hardness of a twist drill so that said hole retains its precision shape after the twist drill has been repeatedly operated through said pilot hole, a movable anvil on each of said arms for defining a precise location along the length of said arms relative to the position of said hole, each of said anvils comprises a face surface for resting against an edge of a work piece and a bias cut section extending across the width of said anvil and receding away from said face surface, said bias section being positioned on said anvils at the points where they approach each other, whereby said anvils may approach each other more closely, scale means on each of said arms for indicating the position of the anvil on that arm with respect to the location of said hole, and vernier scale means on each of said anvils for precisely indicating the position of the anvil on that arm with respect to the location of said hole.

2. The gauge of claim 1 wherein the ratio of the diameter to depth of said pilot hole is equal to or greater than 1:8.

References Cited

UNITED STATES PATENTS

| | | | |
|---|---|---|---|
| 328,699 | 10/1885 | Matern | 33—191 X |
| 2,341,875 | 2/1944 | Malik | 33—191 |
| 2,437,847 | 3/1948 | Zeise | 33—189 |
| 2,447,932 | 8/1948 | Colwill | 33—191 |
| 2,591,814 | 4/1952 | Hill | 33—189 |
| 2,607,990 | 8/1952 | Payamps | 33—189 X |
| 3,210,855 | 10/1965 | Carter et al. | 33—191 |

WILLIAM D. MARTIN, JR., *Primary Examiner.*